United States Patent
Hobson

(10) Patent No.: US 10,957,279 B2
(45) Date of Patent: Mar. 23, 2021

(54) DISPLAYS

(71) Applicant: BAE SYSTEMS plc, London (GB)

(72) Inventor: Ross Renwick Hobson, Rochester (GB)

(73) Assignee: BAE SYSTEMS plc, London (GB)

( * ) Notice: Subject to any disclaimer, the term of this patent is extended or adjusted under 35 U.S.C. 154(b) by 182 days.

(21) Appl. No.: 16/065,244

(22) PCT Filed: Dec. 20, 2016

(86) PCT No.: PCT/GB2016/053997
§ 371 (c)(1),
(2) Date: Jun. 22, 2018

(87) PCT Pub. No.: WO2017/109472
PCT Pub. Date: Jun. 29, 2017

(65) Prior Publication Data
US 2020/0118520 A1    Apr. 16, 2020

(30) Foreign Application Priority Data
Dec. 23, 2015 (GB) .................................. 1522766.3

(51) Int. Cl.
*G09G 5/02* (2006.01)
*G09G 3/34* (2006.01)

(52) U.S. Cl.
CPC ........... *G09G 5/026* (2013.01); *G09G 3/3413* (2013.01); *G09G 2320/0242* (2013.01);
(Continued)

(58) Field of Classification Search
CPC .............................. G09G 5/026; G09G 3/3413
See application file for complete search history.

(56) References Cited

U.S. PATENT DOCUMENTS 6,473,092 B1 *  10/2002  Sojourner ................ G09G 3/34
                                                            345/589
10,368,014 B2 *  7/2019  Wang ..................... H04N 5/2254
(Continued)

FOREIGN PATENT DOCUMENTS

EP        2302616 A1    3/2011
JP      2003248462 A    9/2003
(Continued)

OTHER PUBLICATIONS

International Search Report and Written Opinion received for Patent Application No. PCT/GB2016/053997, dated Feb. 9, 2017. 11 pages.

(Continued)

*Primary Examiner* — Samantha (Yuehan) Wang
(74) *Attorney, Agent, or Firm* — Finch & Maloney PLLC

(57) ABSTRACT

Apparatus and method for field-sequential colour display of a colour image comprising a combination of three component images each representing a respective one of three different component colours of the image. Sequentially, the following steps are performed within a common display frame period. A first component image is displayed using the first component colour. Separately, the second component image is displayed using the second component colour without either of the first component colour and the third component colour. This displays the second component image as a second colour. Separately, the third component image is displayed using the third component colour simultaneously with the second component colour without the first component colour thereby to display the third component image as a resultant colour.

12 Claims, 5 Drawing Sheets

(52) U.S. Cl.
CPC . *G09G 2320/0261* (2013.01); *G09G 2354/00* (2013.01); *G09G 2380/12* (2013.01)

(56) References Cited

U.S. PATENT DOCUMENTS

| | | |
|---|---|---|
| 2002/0060662 A1 | 5/2002 | Hong |
| 2002/0122019 A1 | 9/2002 | Baba et al. |
| 2006/0152456 A1 | 7/2006 | Arnold, II |
| 2007/0206164 A1 | 9/2007 | Beeson et al. |
| 2009/0213037 A1 | 8/2009 | Schon |
| 2011/0025702 A1 | 2/2011 | Lionti |
| 2012/0182331 A1* | 7/2012 | Hinton ................. G09G 3/3413 345/690 |
| 2012/0243103 A1 | 9/2012 | Omura et al. |
| 2013/0194315 A1 | 8/2013 | Trondin |
| 2013/0293598 A1 | 11/2013 | Ishihara |
| 2013/0321477 A1* | 12/2013 | Gandhi ................ G09G 3/2022 345/690 |
| 2016/0322004 A1* | 11/2016 | Yashiki ................ G09G 3/3426 |

FOREIGN PATENT DOCUMENTS

| | | |
|---|---|---|
| WO | 2012/158549 A1 | 11/2012 |
| WO | 2017/109472 A1 | 6/2017 |

OTHER PUBLICATIONS

GB Intellectual Property Office Search Report under Section 17(5) received for GB Patent Application No. 1522766.3, dated May 17, 2016. 7 pages.
International Preliminary Report on Patentability received for Patent Application No. PCT/GB2016/053997. dated Jul. 5, 2018. 8 pages.

\* cited by examiner

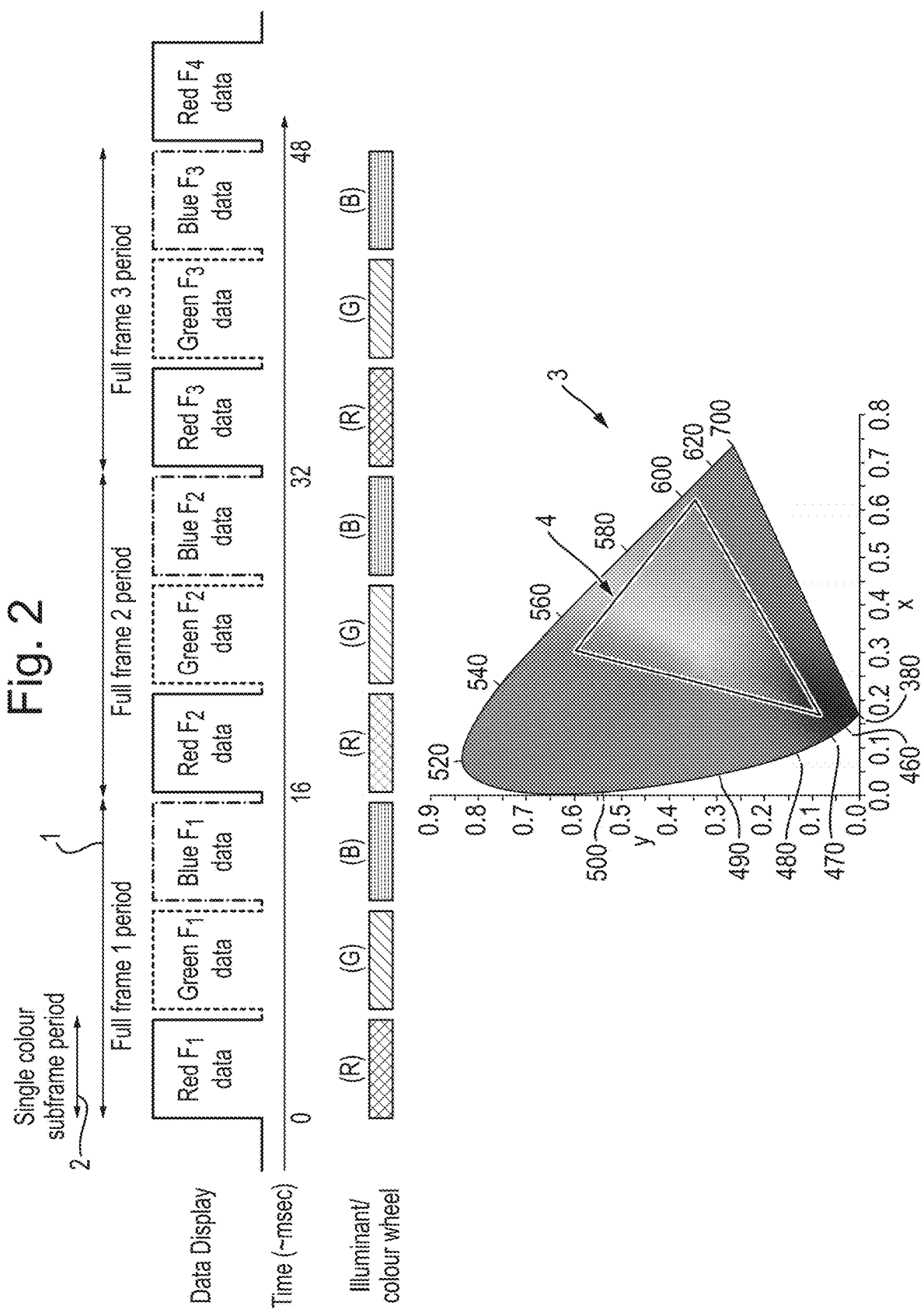

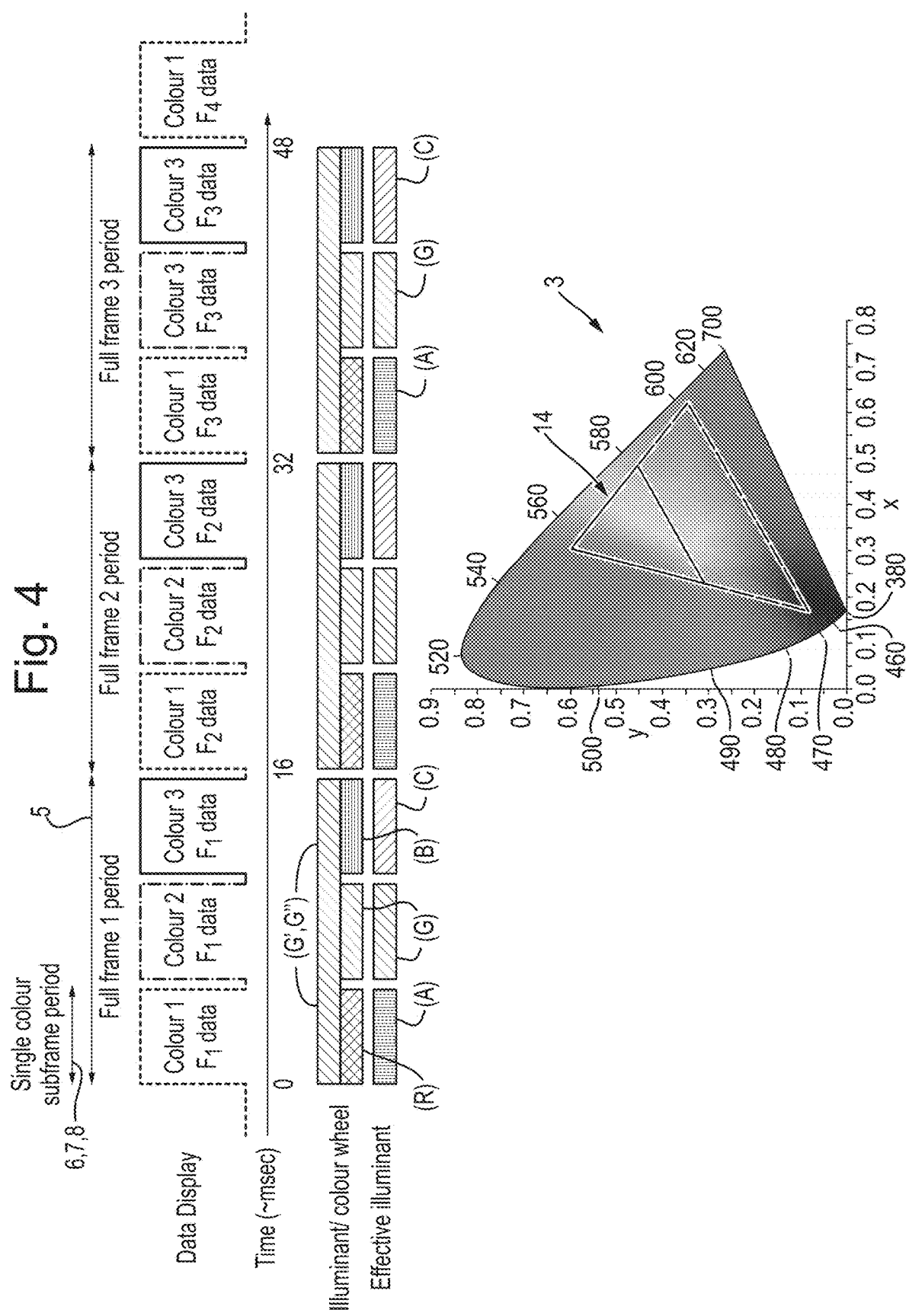

Fig. 5
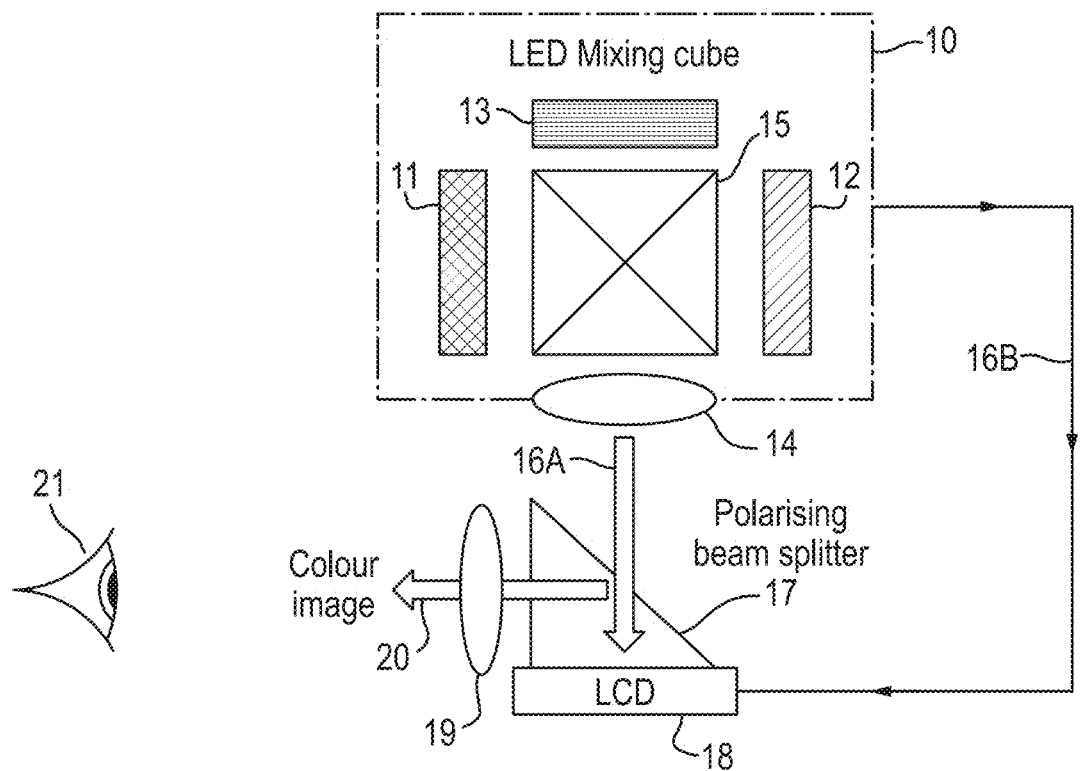
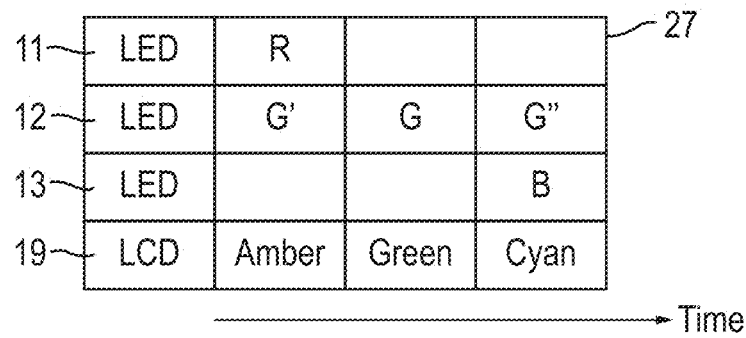

DISPLAYS

FIELD OF THE INVENTION

The invention relates to colour display systems and methods. In particular, though not exclusively, the invention relates to projection colour display systems and methods, preferably, though not exclusively, for use in Helmet Mounted Displays (HMD).

BACKGROUND

Helmet-Mounted Displays (HMD) aim to provide an improved piloting capability and are adapted for use with aircraft pilots and optionally 'pilots' of other vehicles. An HMD is typically adapted to display data e.g. flight parameters in the pilot's field of view to avoid having to consult Head Down Displays at critical moments. The displayed data often takes the form of symbology which is projected for display such that symbols representing outside-world entities move in line with the pilot's head movements. This is discussed in more detail below.

Recent developments in helmet-mounted displays provide full-colour dynamic data, such as flight data, projected directly into a user's line of sight via a large field-of-view, transparent, optical waveguide assembly. This allows the user to maintain his/her gaze and posture in a 'head-up' and 'eyes-out' position thereby greatly enhancing situational awareness whilst controlling a vehicle (e.g. aircraft, of other vehicle). The dynamic data would typically include full-colour symbology which increases the user's ability to rapidly interpret displayed information, resulting in increased efficiency.

However, the applicant has realised that the use of full-colour symbology, as opposed to simpler monochrome symbology, in these circumstances can introduce a number of problems. Most notable amongst these problems is that current technologies require the use of relatively few component colours (e.g. Red, Green, Blue) to draw symbology which may be required in a large number of different colours (e.g. different symbols assigned different colours for intelligibility). Bearing in mind that the human eye responds to different colours differently, being most responsive to the green part of the visible spectrum, and less so to other spectral regions, this introduces the risk that some symbols may be much more difficult to distinguish than others due to their particular colour. This may be particularly problematic in see-through HMDs because the colour symbols are to be viewed against the background of the external environment seen by the user (e.g. bright clouds, in the case of a pilot).

The invention aims to provide an improved display system and method accordingly.

The applicant has realised that in providing colour symbology in a HMD, as opposed to a monochrome symbology, it is desirable to address the problem of 'colour break-up' when doing so. The cause of 'colour break-up' in general is discussed in detail below for the benefit of the reader.

In conventional colour video displays, each image frame is typically also referred to as a 'field' and the field rate may be, e.g. 60 Hz. The colour component images are displayed synchronously on the display such that the observer sees a single correctly coloured image. However, when a field-sequential display is used to display colour video images, the red, blue and green colour component images are drawn sequentially at a field rate which is typically three times (3×) the normal rate, e.g. 180 Hz. A typical field-sequential colour display apparatus employs a liquid crystal display device operating as a monochrome display which is provided with a colour illumination which operates in an alternating sequence of red, blue and green. This means that the alternating, sequential monochrome images corresponding to the red, blue and green colour component images can be seen with appropriately varying colour intensities to give the resultant colour effect in the displayed video.

In the case of an HMDsee-through display, a space-stabilisation display system may often be used. This may include a head tracking system arranged to monitor the position/orientation of the wearers head (e.g. elevation, azimuth, pitch) in order to correspondingly control/shift the display position and orientation of an image displayed on the display screen. This control is done to ensure that the wearer sees the projected image to be stable relative to the real-world environment seen through the display simultaneously. That is to say, the image is seen to overlay the real world beyond, and to be stable in position relative to that real-world view. The real-world view beyond may be, for example, a runway and the space-stabilised image overlaying that view may be flight control calibration symbols, etc.

Consequently, a rotation of the wearer's head causes the space-stabilisation control to apply an equal and opposite movement of the space-stabilised image across the display screen. If the displayed image is created by a device employing field-sequential colour display methods then the problem of so-called 'colour break-up' will arise. In the case that a field sequential colour display device sequentially displays the colour component images the time lag between displaying the sequential colour component images will give rise to a separation of the object into three colour component images as a result of the movement of the displayed image (across the dis[paly screen) relative to the eye. The degree of spatial separation of the colour component images is proportional to the angular velocity of movement of the eye with respect to the display. The effect becomes pronounced when the gaze of the user's eye becomes fixated on a distant outside-world scene, as the eye is prone to do, while the user turns his/her head.

This arises because the on-display position of a first colour component image (e.g. red) within an image frame/field period will be slightly different to the on-display position of the sequentially subsequent colour component image (e.g. green) within the same image frame/field period. The same applied to the successive green and blue component images used in the frame/field period. This means that the viewer will perceive a multi-coloured fringe around a colour image upon the display screen as the red, green and blue component images are caused to appear successively at three slightly different positions on the retina of the user.

The invention aims to provide an improved system and method which desirably addresses this matter, preferably in addition to addressing other matters described above.

BRIEF DESCRIPTION

In a first aspect, the invention provides a method for field-sequential colour display of a colour image comprising a combination of three component images each representing a respective one of three different component colours of the image, the method comprising performing sequentially within a common display frame period the steps of:
   displaying a first component image using a first component colour; and separately,
   displaying a second component image using a second component colour in the absence of both the first component colour and a third component colour thereby to display the second component image as the second colour; and separately, displaying a third component image using the third component colour simultaneously with the second component colour in the absence of the first component colour thereby to display the third component image as a resultant colour.

Preferably, the first component image is displayed using the first component colour simultaneously with the second component colour in the absence of the third component colour thereby to display the first component image as another resultant colour. It has been found the human eye is relatively responsive to Red light and that sufficient visibility of purely red symbols is achievable. However, in preferred embodiments, the first component image may be displayed using a resultant colour enabling better visibility to the user.

Of course, while first, second and third component images, are referred to above this is not limited to only three component images, nor is it to be construed as being limited to only one or two resultant colours. Of course, the inventive concept is applicable to at least a first, second and third component images (e.g. including a fourth, fifth . . . etc.) or more, and the inventive concept is applicable to more than one or two resultant colours (e.g. including a third, fourth, fifth . . . etc.) which may be generated as desired by a suitable combination (simultaneous illumination) of a different two or more of the component colours. For example, the first component colour may be red (R), the second component colour may be green (G), and the third component colour may be blue (B). A first resultant colour may be amber (Red+Green). A second resultant colour may be cyan (Blue+Green). A third resultant colour may be magenta (Red+Blue). The fourth resultant colour may be yellow (Red+Green) . . . etc. etc.

For example, the method may comprise performing within the aforesaid common display frame period the steps of: displaying a fourth component image using one of (e.g. the first) the component colours simultaneously with another of the component colours (e.g. the third) in the absence of yet another of the component colours (e.g. the second) thereby to display the fourth component image as a third resultant colour (e.g. Magenta). This may be done separately from (e.g. sequentially amongst) the displaying of other resultant colours. This enables, for example, symbols of at least four different colours (e.g. any three different resultant colours selected from amongst: Amber, Cyan, Magenta, Yellow; and any component colour from Red, Green and Blue). Other options are possible of course, depending on the initial colour choices/assignment for the first, second and third component colours.

For example, the method may comprise performing sequentially within the aforesaid common display frame period the steps of: displaying a fifth component image using one of (e.g. the first) the component colours simultaneously with another of the component colours (e.g. the second) in the absence of yet another of the component colours (e.g. the third) thereby to display the fifth component image as a fourth resultant colour (e.g. yellow). This may be done separately from (e.g. sequentially amongst) the displaying of other resultant colours. This enables, for example, symbols of at least five different colours (e.g. any four different resultant colours selected from amongst: Cyan, Amber, Magenta, Yellow; and any one component colour from Red, Green and Blue). Other options are possible of course, depending on the initial colour choices/assignment for the first, second and third component colours.

Furthermore, the method may include displaying a component image using the first component colour (e.g. Red) in the absence of both the second component colour (e.g. Green) and the third component colour (e.g. Blue) thereby to display that component image as the first component colour, separately. Again, this enables, for example, symbols of five different colours (e.g. any three different resultant colours selected from amongst: Amber, Cyan, Magenta, Yellow; and any two component colour from Red, Green and Blue). For example, Red, Green, Cyan, Magenta and yellow/Amber symbols may be generated separately. This would be consistent with the 'Mil-Std-2525c' symbology colour assignment standard discussed below.

These colours may be colours compliant with, or according to, a CIE chromaticity standard. An example is CIE 1931 2° (*Commission Internationale de l'Eclairage*) colour space (e.g. the CIE 1931 RGB colour space or the CIE 1931 XYZ colour space). The second component colour may illuminate each of the first, second and third component images so that it is used in combination with one or more of the other component colours to illuminate two of these three component images.

An advantage provided by the simultaneous use of two component colours to generate display symbols stems from the ability to control the luminance levels at which each of the component images is illuminated in the display (e.g. first, second and third component images, or more, such as four of five or more). This may include controllably adding the appropriate amount of light (i.e. additional luminance) of the second component colour to the luminance amounts of other component colours used to illuminate the first and/or third (and/or $4^{th}$ or $5^{th}$ etc., as appropriate) component images, respectively. For example, preferably, the luminance level at which the second component image is displayed is substantially equal to the luminance level at which the first component image is displayed. Preferably, the luminance level at which the second component image is displayed is substantially equal to the luminance level at which the third component image is displayed. Preferably, the luminance level at which the second component image is displayed is substantially equal to the luminance level at which any desired other component image (e.g. $4^{th}$, $5^{th}$ etc.) is displayed. The result may be such that, preferably, some or each of the first, second and third (and any other) component images is illuminated at substantially the same luminance level. This enables display symbols of different colours (e.g. first resultant colour, second resultant colour, third resultant colour, . . . etc. or second component colour) to have substantially equal luminance. Preferably all displayed colours (e.g. symbology) may have substantially the same luminance level. Optionally, red component images may be displayed at a lower luminance level if desired/appropriate given the visual responsiveness of the human eye to that colour. Herein, 'substantially equal' is intended to include essentially, or practically, the same or 'about' the same. The term 'about' when used in this specification refers to a tolerance of ±10%, of the relevant or stated quantity or value, i.e. about 50% encompasses any value in the range 45% to 55%, In further embodiments 'about' refers to a tolerance of ±5%, ±2%, ±1%, ±0.5%, ±0.2% or 0.1% of the relevant or stated quantity or value.

Consequently, the method may comprise displaying a colour image containing of a plurality of separate image objects (e.g. symbols, whether calligraphic or numerical etc.), wherein at least some or each image object is composed of a respective one of at least: the first resultant colour; the second resultant colour; and the second component colour (optionally further resultant colours as discussed herein). This is especially useful when colour-coding of image objects is important, or may be quite critical. An example of a critical need to colour-code different image objects is when the objects are colour coded to represent their hostility to the wearer. If the displayed image objects are displayed upon a see-through display screen (e.g. a Heads-Up Display (HUD), or a Helmet-Mounted Display (HMD)), they may represent vehicles, buildings, infrastructure or personnel overlaid upon a real-world view seen by the user (e.g. a pilot within a cock-pit of an aircraft). This technique is commonly employed according to the so-called 'Military standard'. This is a United States/NATO defense standard, often called a military standard, "MIL-STD", "MIL-SPEC", or (informally) "MilSpec", and is used to help achieve standardization beneficial in achieving interoperability, and compatibility with logistics systems. Used as a standard for military map marking symbols, it is also used in generating display symbols and icons in HUD and HMD systems. Colour-coding is used to denote affiliation of the icon/symbol. This refers to the relationship of the user to the object being represented. The basic affiliation categories are:

'Unknown', 'Friend', 'Neutral', 'Civilian' and 'Hostile'.

For example, in the ground unit domain, a yellow/amber icon is used to denote 'Unknown' affiliation, a blue/cyan icon to denote 'Friendly' affiliation, a green icon denotes 'Neutral' affiliation, a yellow or amber icon denotes 'Civilian' affiliation, and a red icon denotes 'Hostile' affiliation. In the other domains (air and space, sea surface and subsurface, etc.), the same colour scheme is used. An example is 'Mil-Std-2525c'.

In these circumstances, it is important that colours are reliably displayed. Preferably, the luminance level of the second component colour when used simultaneously with the first component colour differs from the luminance level of the second component colour when used simultaneously with the third component colour. This enables RGB input component colour luminance levels to be modified to provide a desired luminance level in each of the two resultant colours used to illuminate the first and third component images. For example, the luminance level of the first component colour (e.g. Red), the luminance level of the second component colour (e.g. Green), and the luminance level of the third component colour (e.g. Blue) may be arranged in relative proportions defined according to a white level colour-balance (e.g. RGB colour balance, such as input from a PAL video system). This may be a colour-balance according to a CIE chromaticity standard, such as described above.

The method may be applied to, or implemented by, a head mounted display (HMD) or a heads-Up Display (HUD). In either case, the method may be applied to, or implemented using a see-through display. The method may be applied to, or implemented using a space-stabilisation display system. Such a system may include a head tracking system arranged to monitor the position/orientation of the wearers head (e.g. elevation, azimuth, pitch) in order to correspondingly control/shift the display position and orientation of an image displayed on the display screen. This control may be done to render the projected image to be substantially stable relative to the real-world environment seen through the display simultaneously. Consequently, the image may be displayed so as to be seen by the user to stably overlay the real world view beyond. The method may be applied to, or implemented to include such space stabilised display such that a rotation of the wearer's head causes a space-stabilisation control to apply an equal and opposite movement of the space-stabilised image across the display screen.

Thus, in summary, the component images of the display may be displayed using at least three (e.g. optionally five, or more) different colours (e.g. two or more different resultant colours, and one component colour which is different to the two or more resultant colours) of efficiently controllable luminance levels using just three component colours. An additional advantage of the methodology is that because the resultant colours are each generated using two component colours simultaneously, not sequentially, this means that the resultant colours do not suffer from colour break-up problem described above. Thus in addition to being able to control colour luminance efficiently as desired to permit good user-perception, the invention may at least to some extent mitigate the effects of colour break-up at the same time.

In a second aspect, the invention provides a display apparatus arranged to implement the method described above. For example, the invention may provide a display apparatus for field-sequential colour display of a colour image comprising a combination of three component images each representing a respective one of three different component colours of the image, the apparatus being arranged for performing sequentially within a common display frame period the steps of:

displaying a first said component image using a first component colour; and separately, displaying a second component image using a second component colour in the absence of both said first component colour and a third component colour thereby to display said second component image as the second colour; and separately, displaying a third component image using said third component colour simultaneously with said second component colour in the absence of said first component colour thereby to display said third component image as a resultant colour.

Preferably, the apparatus is arranged to display the first component image using the first component colour simultaneously with the second component colour in the absence of the third component colour thereby to display the first component image as another resultant colour.

Preferably, the apparatus is arranged to display during the aforesaid common display frame period: a fourth component image using one of (e.g. the first) the component colours simultaneously with another of the component colours (e.g. the third) in the absence of yet another of the component colours (e.g. the second) thereby to display the fourth component image as a third resultant colour (e.g. Magenta). This may be done separately from (e.g. sequentially amongst) the displaying of other resultant colours. This enables, for example, symbols of at least four different colours as described above.

Preferably, the apparatus is arranged to display during the aforesaid common display frame period: displaying a fifth component image using one of (e.g. the first) the component colours simultaneously with another of the component colours (e.g. the second) in the absence of yet another of the component colours (e.g. the third) thereby to display the fifth component image as a fourth resultant colour (e.g. yellow). This may be done separately from (e.g. sequentially amongst) the displaying of other resultant colours. This enables, for example, symbols of at least five different colours as discussed above.

Preferably, the apparatus is arranged to display during the aforesaid common display frame period: a component image using the first component colour (e.g. Red) in the absence of both the second component colour (e.g. Green) and the third component colour (e.g. Blue) thereby to display that component image as the first component colour, separately.

The display apparatus may be arranged to control the luminance levels such that the second component image is displayed at a luminance level substantially equal to the luminance level at which the first component image is displayed. The display apparatus may be arranged to control the luminance levels such that the second component image is displayed at a luminance level substantially equal to the luminance level at which the third component image is displayed. The display apparatus may control the luminance level at which one or each of said first component image and said third component image is displayed respectively so as to be substantially equal to the luminance level at which said second component image is displayed Preferably, the display apparatus may be arranged for displaying a colour image containing of a plurality of separate image objects, wherein at least some or each image object (e.g. icon) is composed of a respective one of: the resultant colour; the second/another resultant colour; the second component colour.

The display apparatus may be arranged such that the first component colour is red (R). The display apparatus may be arranged such that the second component colour is green (G). The display apparatus may be arranged such that the third component colour is blue (B). These colours may be defined according to a CIE chromaticity standard.

The display apparatus may be arranged such that the first resultant colour is amber. This colour may be defined according to a CIE chromaticity standard. The display apparatus may be arranged such that the another/second resultant colour is cyan. This colour may be defined according to a CIE chromaticity standard.

The display apparatus may be arranged to control the luminance level of the second component colour when used simultaneously with the first component colour so as to differ from the luminance level of the second component colour when used simultaneously with the third component colour.

The display apparatus may be arranged to control the luminance level of the first component colour, the luminance level of the second component colour, and the luminance level of the third component colour so as to be in relative proportions defined according to a white level colour-balance. The white-balance may be according to a CIE chromaticity standard.

The invention, in a further aspect, may provide a head mounted display (HMD) or a heads-Up Display (HUD) incorporating the apparatus described above. The head mounted display (HMD) or a heads-Up Display (HUD) may incorporate a see-through display for displaying the image (s) as described above. The head mounted display (HMD) may be arranged to implement space-stabilisation to the image when displayed thereby, and may include a head tracking system arranged to monitor the position/orientation of the wearers head (e.g. elevation, azimuth, pitch) in order to correspondingly control/shift the display position and orientation of an image displayed on the display screen. This may be arranged to render the projected image to be substantially stable relative to the real-world environment seen through the display simultaneously. The HMD may be arranged to display the image(s) so as to be seen by the user to stably overlay the real world view beyond. The HMD may be arranged to implement such space stabilised display such that a rotation of the wearer's head causes a space-stabilisation controller thereof to apply an equal and opposite movement of the space-stabilised image across the display screen. The display screen may be transparent or see-though. The display screen may be a display screen of a HMD and may be a see-through display screen.

There now follow some examples of the many and various embodiments of the invention. These describe embodiments which are useful for a better understanding of the invention, but which are not intended to be limiting.

BRIEF DESCRIPTION OF THE DRAWINGS

FIG. 2 schematically shows a conventional field-sequential colour projection addressing scheme;

FIG. 4 schematically shows a field-sequential colour projection addressing scheme according to the timing control arrangement of FIG. 3A;

FIG. 5 schematically shows a field-sequential colour projection display system for a helmet mounted display (HMD) employing a see-through display screen.

DETAILED DESCRIPTION

Figure 1A:
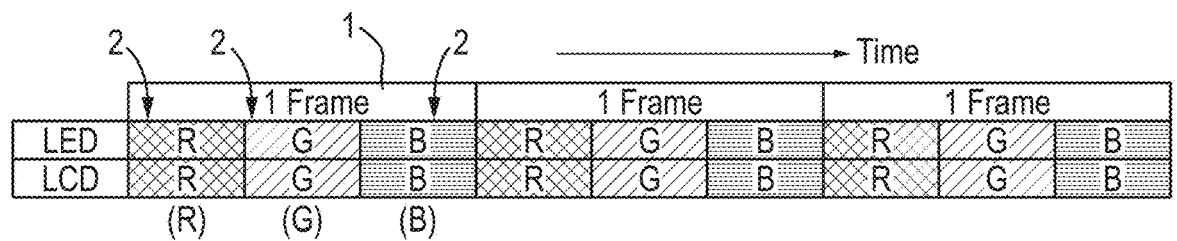
FIG. 1A schematically shows a conventional field-sequential colour projection display timing control arrangement.

In the drawings, like items are assigned like reference symbols.

FIG. 1A schematically illustrates a conventional field-sequential colour projection display timing control arrangement for use in displaying colour video by projection. A combination of three component images (2) each representing a respective one of three different component colours (red=R; green=G; blue=B) of a video image frame are displayed sequentially each within a respective sub-frame portion of the same one image frame display period (1). By sequentially displaying the red, green and blue image content at a sufficiently high frequency, the human eye integrates the colour content together to form a colour image within each frame period.

In particular, a red LED light source is arranged to illuminate and LCD projection display panel during a $1^{st}$ sub-frame portion of a frame period within which the LCD display panel is controlled to draw or present the red component image of the video image frame. Once the $1^{st}$ sub-frame portion of the frame period has ended, a $2^{nd}$ sub-frame portion of the frame period is commenced within which the LCD display panel is controlled to draw or present the green component image of the video image frame, whilst illuminated by only a green LED light source. Subsequently, after termination of the $2^{nd}$ sub-frame portion of the frame period, a $3^{rd}$ sub-frame portion commences during which the LCD display panel is controlled to draw or present the blue component image of the video image frame, whilst illuminated by only a blue LED light source. This represents completion of the display of the $1^{st}$ colour frame of video. A subsequent frame of video is then presented and displayed in the same manner.

Figure 1B:
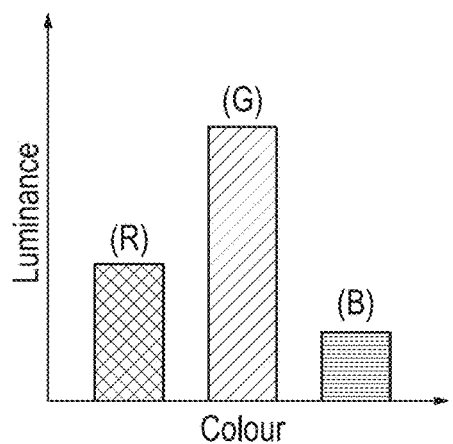
FIG. 1B schematically shows the relative luminance levels assigned to RGB component colours to achieve white-balance according to a CIE chromaticity standard used in generating a colour video image (e.g. PAL video) according to the projection display control arrangement of FIG. 1A.

FIG. 1B schematically shows the relative luminance levels assigned to the red, green and blue (RGB) component colours of a video frame as would be required to achieve white-balance according to a CIE chromaticity standard. For example, white is created by balancing in the following proportions:

$$Y=0.299R+0.587G+0.1148$$

Figure 1C:
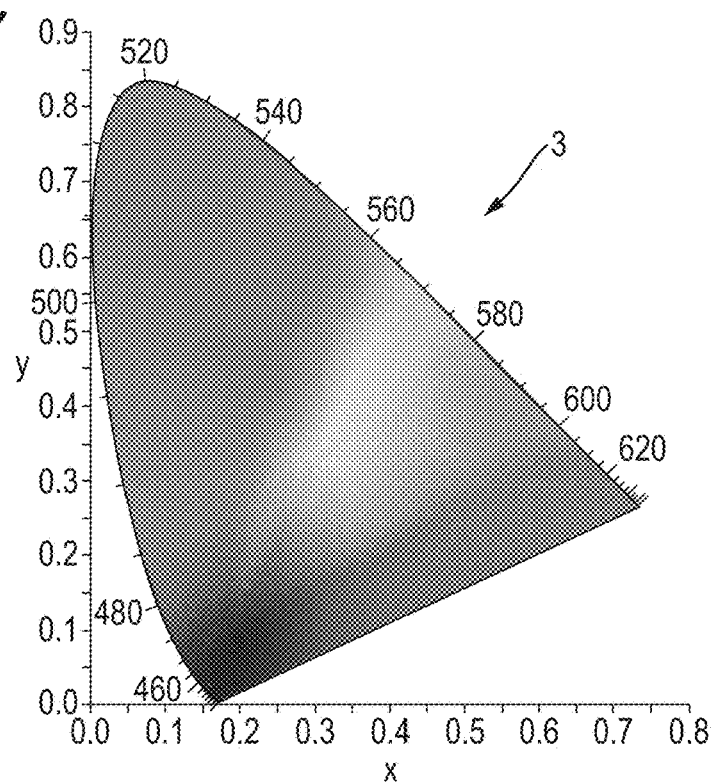
FIG. 1C shows the CIE 1931 colour space chromaticity diagram. The outer curved boundary is the spectral (or monochromatic) locus, with wavelengths shown in nanometres.

These particular proportions depend, to some extent, on the particular wavelengths used to define the component colours RGB, as would be readily appreciated by the skilled person. Different colour mixtures are achieved by varying these relative proportions in whatever manner is required to achieve the desired colour mixture, according to the chromaticity diagram (3) illustrated in FIG. 1C. In particular, FIG. 1C shows the CIE 1931 2° colour space chromaticity diagram. The outer curved boundary is the spectral (or monochromatic) locus, with wavelengths shown in nanometres.

FIG. 2 schematically shows a conventional field-sequential colour projection addressing scheme. During each successive single colour sub-frame period (2) within a given full frame period (1), a succession of three different display drive signals are issued to an LCD projection display panel arranged in order to control that panel to draw a respective one of a succession of three component images for use in projecting, respectively, three component colours of the colour frame in question. A $1^{st}$ full frame period ($F_1$) comprises a succession of a 1st group of three component image drive signals (Red $F_1$ data, Green $F_1$ data, Blue $F_1$ data), followed in a $2^{nd}$ full frame period ($F_2$) by a succession of a $2^{nd}$ group of three component image drive signals (Red $F_2$ data, Green $F_2$ data, Blue $F_2$ data), and then by a succession of $3^{rd}$ group of drive signals (Red $F_3$ data, Green $F_3$ data, Blue $F_3$ data). Typically, shown in this schematic example, each full frame period is 16 ms in length. In coordination with this, illumination signals are issued to an illuminant device (e.g. a colour LED, or a colour wheel illuminated with white light) such that the LCD projection display panel is eliminated with an illuminant light of colour appropriate to the drive signal issued to the display panel at that time. For example, the illuminant colour is red light (e.g. from a red LED) whenever Red data drive signals are issued to the LCD display panel, greenlight when Green data drive signals are issued or blue light when Blue drive data signals are issued. This typically results in a full colour gamut (4) within the chromaticity diagram (3).

Figure 3A:
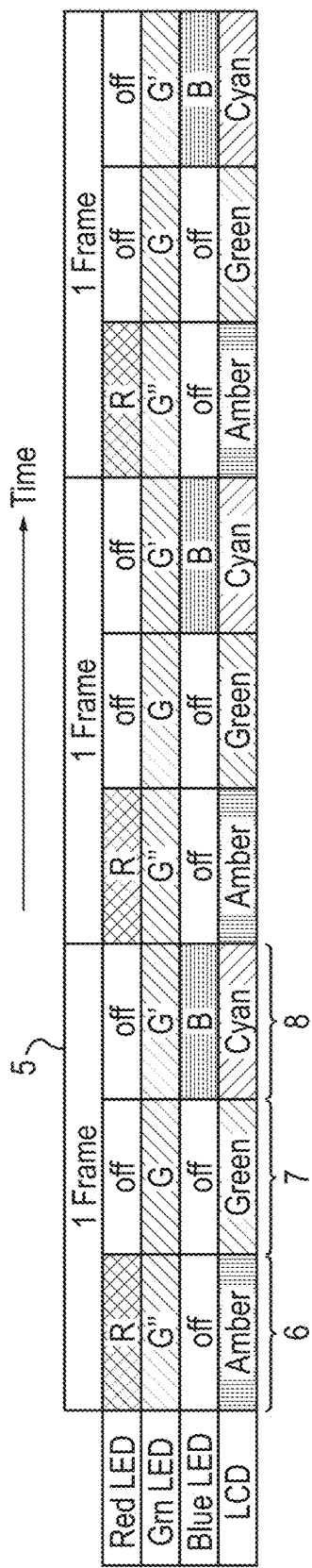
FIG. 3A schematically shows a field-sequential colour projection display timing control arrangement according to an embodiment of the invention.

FIG. 3A schematically shows a field-sequential colour projection display timing control arrangement according to an embodiment of the invention for use in displaying colour video by projection. A combination of three component images each representing a respective one of three different resultant/component colours (Amber=A; Green=G; Cyan=C) of a video image frame are displayed sequentially each within a respective sub-frame portion (6, 7, 8) of the same one image frame display period (5).

A red LED light source (11, FIG. 5) and a green LED light source (12, FIG. 5) are each controlled to illuminate an LCD projection display panel (19, FIG. 5) during a $1^{st}$ sub-frame portion (6) of a frame period within which the LCD display panel is controlled to draw or present the amber component image of the video image frame. The combination of simultaneous illumination by both the red (R) component colour, and the green (G") component colour results in an illuminant which has the resultant colour of amber. The green LED light source is controlled such that the luminance of the green (G') component colour, when added to the luminance of the red (R) component colour, achieves a predefined luminance level for the resultant amber colour. A blue LED light source (13, FIG. 5) is maintained in the "off" state during this $1^{st}$ sub-frame portion of the frame period so as to not eliminate the LCD display panel.

Subsequently, in a $2^{nd}$ sub-frame portion (7) of the frame period (5) red LED light source (11, FIG. 5) is maintained in the "off" state. However, during this $2^{nd}$ sub-frame portion, the green LED light source (12, FIG. 5) alone is controlled to illuminate an LCD projection display panel (19, FIG. 5). During this $2^{nd}$ sub-frame portion the LCD display panel is controlled to draw or present the green (G) component image of the video image frame. The green LED light source is controlled such that the luminance of the green (G) component colour, alone, achieves the aforesaid predefined luminance. The blue LED light source (13, FIG. 5) is maintained in the "off" state during this $1^{st}$ sub-frame portion of the frame period so as to not eliminate the LCD display panel.

Once the $2^{nd}$ sub-frame portion (7) of the frame period has ended, a $3^{rd}$ sub-frame portion (8) of the frame period (5) is commenced within which the LCD display panel is controlled to draw or present the cyan component image of the video image frame, whilst illuminated by the green LED light source and the blue LED light source. The combination of simultaneous illumination by both the blue (B) component colour and the green (G") component colour results in an illuminant which has the resultant colour of cyan. The green LED light source is controlled such that the luminance of the green (G') component colour, when added to the luminance of the blue (B) component colour, achieves the aforesaid predefined luminance level for the resultant cyan colour. The red LED light source (11, FIG. 5) is maintained in the "off" state during this $3^{rd}$ sub-frame portion of the frame period so as to not eliminate the LCD display panel.

Figure 3C:
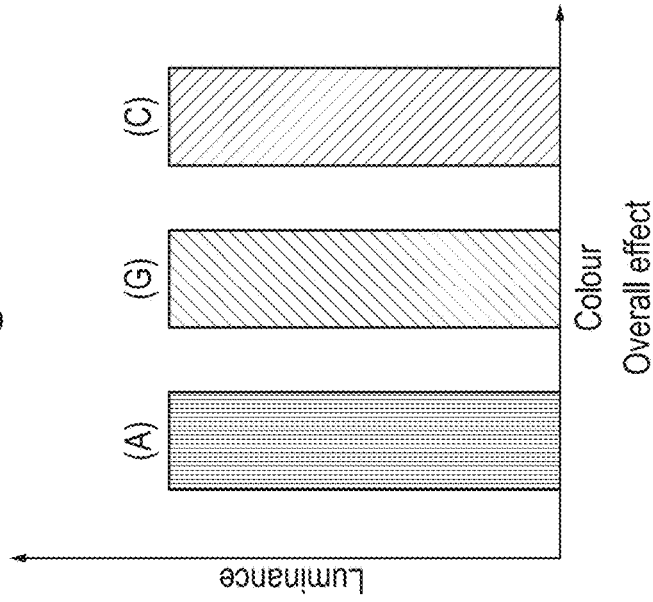
FIGS. 3B and 3C schematically shows the relative luminance levels assigned to RGB component colours to achieve equal luminance in display colours (amber, green, cyan) used in generating a colour video image according to the projection display control arrangement of FIG. 3A.

This represents completion of the display of the $1^{st}$ colour frame (5) of video. Each one of the $1^{st}$ $2^{nd}$ and $3^{rd}$ component images is presented using, respectively, amber light (A), green light (G) and cyan light (C), each at the same predefined luminance level. This predefined luminance level is schematically illustrated in FIG. 3C. A subsequent frame of video is then presented and displayed in the same manner.

Figure 3B:
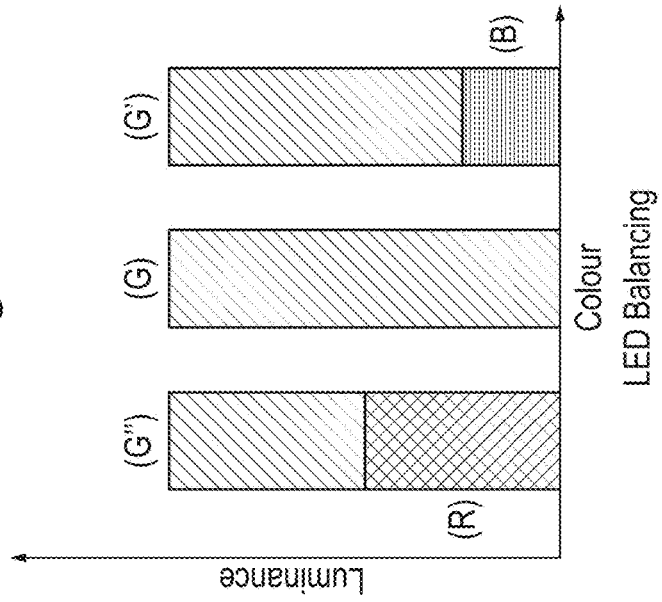

FIG. 3B schematically shows the relative luminance levels assigned to the red, green and blue (R, G, B) component colours of a video frame as would be required notionally to achieve white-balance according to a CIE chromaticity standard if the green LED were not illuminating the LCD display panel during the $1^{st}$ and $3^{rd}$ sub-frame portions (6, 8). For example, notional white is created by balancing the red green and blue luminances (RGB) in the following proportions:

$$Y=0.299R+0.587G+0.1148$$

Once more, these particular proportions depend, to some extent, on the particular wavelengths used to define the component colours RGB, as would be readily appreciated by the skilled person. However, the red and blue component colours are not employed in isolation, and are instead used together with a predetermined amount of green component colour (G", G'). The relative proportions of the luminances of the green light used during the $1^{st}$ and $3^{rd}$ sub-periods (6, 8), respectively, relative to the luminance level of greenlight used during the $2^{nd}$ sub-period, is:

$$G''=0.491G$$

$$G'=0.806G$$

FIGS. 3B and 3C together schematically show the relative luminance levels assigned to RGB component colours and the green luminance (G", G') employs during the $1^{st}$ and $3^{rd}$ sub-periods to achieve equal luminance in display colours (amber, green, cyan) used in generating a colour video image according to the projection display control arrangement of FIG. 3A.

FIG. 4 schematically shows a field-sequential colour projection addressing scheme according to the timing control arrangement of FIG. 3A. During each successive sub-frame period (6, 7, 8) within a given full frame period (5), a succession of three different display drive signals are issued to an LCD projection display panel arranged in order to control that panel to draw a respective one of a succession of three component images for use in projecting, respectively, three component colours of the colour frame in question. A $1^{st}$ full frame period ($F_1$) comprises a succession of a $1^{st}$ group of three component image drive signals (Colour 1 [Amber] $F_1$ data, Colour 2 [Green] $F_1$ data, Colour 3 [Cyan] $F_1$ data), followed in a $2^{nd}$ full frame period ($F_2$) by a succession of a $2^{nd}$ group of three component image drive signals (Colour 1 [Amber] $F_2$ data, Colour 2 [Green] $F_2$ data, Colour 3 [Cyan] $F_2$ data), and then by a succession of $3^{rd}$ group of drive signals (Colour 1 [Amber] $F_3$ data, Colour 2 [Green] $F_3$ data, Colour 3 [Cyan] $F_3$ data). Typically, shown in this schematic example, each full frame period is 16 ms in length.

In coordination with this, illumination signals are issued to an illuminant device (e.g. a colour LED, or a colour wheel illuminated with white light) such that the LCD projection display panel is eliminated with an illuminant light of colour appropriate to the drive signal issued to the display panel at that time. For example, the illuminant colour is Amber light (from a red LED and a green LED combined) whenever Colour 1 [Amber] data drive signals are issued to the LCD display panel, green light (from the green LED alone) when Green data drive signals are issued or Cyan light (from a blue LED and a green LED combined) when Cyan drive data signals are issued. This typically results in a full colour gamut (14) within the chromaticity diagram (3, FIG. 4).

FIG. 5 schematically shows a field-sequential colour projection display system for a helmet mounted display (HMD).

In particular, the colour projection display system includes a video and illumination control unit (10) including a video image source (not shown) arranged for generating video imagery comprising a succession of video image frames (5) containing symbology, icons or other image objects for display to a user (21) of the (HMD). The video image source is connected to a colour projection LCD projection screen unit (17, 18, 19) via a signal transmission line (16B) arranged to convey LCD projection screen driving signals, as described above, for controlling the LCD projection screen unit to draw a respective one of three or more component images at appropriate respective sub-frame portions (6, 7, 8) of each full frame period (5) of video content. In other examples, a frame period may be divided into 5 sub-frame periods (not shown), rather than just three, to permit generation of symbology using five colours such as: amber/yellow, green, red cyan, magenta. For example, symbology compliant with the colour scheme of 'Mil-Std-2525c' may be used. This may comprise yellow/amber icons, blue/cyan icons, green icons, red icons and/or magenta icons.

The projection display system also includes a red LED unit (11), a green LED unit (12), and a blue LED unit (30) each adapted and arranged separately to provide respective coloured light (red, green, blue) for input to a light combiner a unit (14, 15) adapted and arranged to combine the light input simultaneously from any number of these three LED units into a mixed colour light signal of luminance equal to the sum of the component colour luminances within the colour mixture. The light combiner unit comprises an output optical lense (14) and intermediate mirrors (15) which may be of a structure and design such as would be readily apparent and available to the skilled person (e.g. a "mixing cube"), and shall not be discussed in detail here. Suffice to say that the light combiner unit is arranged to output a mixed colour light signal (16A) when multiple LEDs are illuminating, or a single colour when a single LED is illuminating, as appropriate for input to colour projection LCD projection screen unit (17, 18, 19) for projection thereby. The colour projection LCD projection unit may be of a structure and design such as would be readily apparent and available to the skilled person. Both the LCD control/drive signals (16B) and the mixed colour (or single colour as appropriate) light signal (16A) output from the video and illumination control unit (10) are received at the LCD projection screen unit (17, 18, 19) for enabling the LCD projection screen to present the appropriate component image whilst being simultaneously illuminated by the appropriate colour of light.

The colour projection LCD projection screen unit (17, 18, 19) comprises a polarising beam splitter prism (17) arranged for receiving and polarising the mixed colour light signal (16A) output from the video and illumination control unit (10), and for transmitting the polarised light through to an LCD display panel (18) arranged adjacent the prism. Accordingly, polarised light bathes the surface of the LCD. The LCD display panel is arranged bear an appropriate component image across its surface according to, and in response to, the LCD drive/control signals (16B) received by it. The LCD display panel includes a polariser (analyser) and subsequent mirror arranged across its reverse surface (converse to the light input surface thereof). As polarized light from the polarising beam splitter passes through the LCD panel and analyzer, individual pixels of the LCD panel are opened to allow light to pass or closed to block the light. The combination of open and closed pixels produces the desired component image for projection by reflection back to the internally reflective input surface of the beam-splitting prism (17) for reflection there towards n optical projection output port (19) of the LCD projection screen unit comprising a lens (or lenses) (19). The output port is adapted to outwardly project image-bearing output light (20) conveying a projection of the image presented by the LCD projection screen at a given point in time. The output light is directed to a user for viewing. For example, the output light may be directed to an optical input port of a transparent/see-through display screen (not shown) of a type readily available to the skilled person for HMD uses. The see-through display screen is of a design and structure such as would be readily available to the skilled person.

The illumination and video controller (10) is adapted and arranged to implement LED illumination and LCD drive control signals (27) as shown schematically in FIG. 5, corresponding to the methodology described above with reference to FIGS. 3A, 3B, 3C and FIG. 4, in detail.

While embodiments disclosed herein relate to HMDs, it is to be understood that the invention is equally applicable to non-helmet-mounted see-through displays, such as heads-up displays.

The embodiments described herein are presented so as to allow a better understanding of the invention, and are not intended to limit the scope of the inventive concept of the invention. Variations, modifications and equivalents to the embodiments described herein such as would be readily apparent to the skilled reader, are intended to be encompassed within the scope of the invention.

The invention claimed is:

1. A method for field-sequential colour display of a colour image comprising a combination of three component images each representing a respective one of three different component colours of the image, the method comprising performing sequentially within a common display frame period:
   displaying a first component image using a first component colour simultaneously with a second component colour in the absence of a third component colour to display the first component image as a first resultant colour; and separately,
   displaying a second component image using a second component colour in the absence of both the first component colour and the third component colour to display the second component image as a second resultant colour; and separately,
   displaying a third component image using the third component colour simultaneously with the second component colour in the absence of the first component colour to display the third component image as a third resultant colour; and
   adding additional luminance to the second component colour during display of the second component image relative to a luminance of the second component colour during display of the first and/or third component image such that a luminance level at which the second component image is displayed is substantially equal to a luminance level at which the first and/or third component image is displayed,
   wherein the second resultant colour is different from the first resultant colour and the third resultant colour, and
   wherein the first, second, and third component images are each displayed at a different time.

2. The method according to claim 1 comprising displaying a colour image including one or more separate image objects, wherein each of the one or more image objects includes the first colour, the second colour, and/or the third colour.

3. The method according to claim 1 wherein the first component colour is red (R), the second component colour is green (G), and the third component colour is blue (B).

4. The method according to claim 1 wherein the first colour is amber and the third colour is cyan.

5. The method according to claim 1 wherein a luminance level of the second component colour when used simultaneously with the first component colour differs from a luminance level of the second component colour when used simultaneously with the third component colour.

6. The method according to claim 1 wherein a luminance level of the first component colour, a luminance level of the second component colour, and a luminance level of the third component colour are in relative proportions defined according to a white level colour-balance.

7. A display apparatus for field-sequential colour display of a colour image comprising a combination of three component images each representing a respective one of three different component colours of the image, the apparatus being arranged for performing sequentially within a common display frame period:
   displaying a first component image using a first component colour simultaneously with a second component colour in the absence of a third component colour to display the first component image as a first resultant colour; and separately,
   displaying a second component image using a second component colour in the absence of both the first component colour and the third component colour to display the second component image as a second resultant colour; and separately,
   displaying a third component image using the third component colour simultaneously with the second component colour in the absence of the first component colour to display the third component image as a third resultant colour; and
   adding additional luminance to the second component colour during display of the second component image relative to a luminance of the second component colour during display of the first and/or third component image such that a luminance level at which the second component image is displayed is substantially equal to a luminance level at which the first and/or third component image is displayed,
   wherein the second resultant colour is different from the first resultant colour and the third resultant colour, and
   wherein the first, second, and third component images are each displayed at a different time.

8. The display apparatus according to claim 7, wherein the display apparatus is configured to display a colour image including one or more separate image objects, wherein each of the one or more image objects includes the first colour, the second colour, and/or the third colour.

9. The display apparatus according claim 7 wherein the first component colour is red (R), the second component colour is green (G), and the third component colour is blue (B).

10. The display apparatus according to claim 7 wherein the first colour is amber and the third colour is cyan.

11. The display apparatus according to claim 7 wherein the display apparatus is configured to control a luminance level of the second component colour when used simultaneously with the first component colour so as to differ from a luminance level of the second component colour when used simultaneously with the third component colour.

12. The display apparatus according to claim 7 wherein the display apparatus is configured to control a luminance level of the first component colour, a luminance level of the second component colour, and a luminance level of the third component colour so as to be in relative proportions defined according to a white level colour-balance.

* * * * *